United States Patent

Takahashi et al.

[15] 3,679,287
[45] July 25, 1972

[54] ILLUMINATION SYSTEM FOR LIGHT MICROSCOPES

[72] Inventors: Kinji Takahashi; Megumu Shio, both of Yokohama, Japan

[73] Assignee: Nippon Kogaku K.K., Tokyo, Japan

[22] Filed: Dec. 4, 1970

[21] Appl. No.: 95,069

[30] Foreign Application Priority Data

Dec. 16, 1969    Japan..............................44/118912

[52] U.S. Cl..................................................350/87, 350/39
[51] Int. Cl. .........................................................G02b 21/08
[58] Field of Search..............................................350/87, 39

[56] References Cited

UNITED STATES PATENTS

| | | | |
|---|---|---|---|
| 2,264,835 | 12/1941 | Flint | 350/87 |
| 1,995,599 | 3/1935 | Bauersfeld | 350/87 |
| 2,484,972 | 10/1949 | Turrettini | 350/87 X |
| 2,977,848 | 4/1961 | Malfeld | 350/87 |

*Primary Examiner*—David H. Rubin
*Attorney*—Ward, McElhannon, Brooks & Fitzpatrick

[57] ABSTRACT

In a microscope utilizing Köhler's illumination method, each ratio of a focal length of an objective to that of a paired condenser lens of a plurality of such objective-and-condenser-lens pairs is made constant regardless of the magnifying powers of these pairs. Uniformly illuminated field of view is always obtained without adjusting the field stop and aperture stop even when the objective is changed.

3 Claims, 2 Drawing Figures

PATENTED JUL 25 1972

3,679,287

ILLUMINATION SYSTEM FOR LIGHT MICROSCOPES

BACKGROUND OF THE INVENTION

The present invention relates to an improvement of an illumination system for microscopes.

Among the various illumination systems or methods for microscopes, Köhler's method is an excellent method for visual observation and photography. In general the Köhler's method must satisfy the following conditions:

I. The image of a light source formed by a condenser lens system must be focused upon a plane of a pupil of an objective lens and must sufficiently cover the diameter of the pupil of the objective lens so that only a required aperture angle may be uniformly illuminated by adjusting an aperture stop in an illumination system;

II. The image of a field stop in the illumination system formed by the condenser system must be in focus with a plane of an object to be observed so that only a required field of illumination (an area to be illuminated) may be illuminated by adjusting the field stop; and said aperture stop and the field stop are arranged to be individually controlled.

However, in the conventional illumination system for the microscopes it is extremely difficult to satisfy the above conditions from a low magnification to a high magnification so that a compromise must be reached among the above conditions within a limit which will not adversely affect the observation or photography in practice. For this purpose there have been generally proposed the following methods:

A. The condenser system in the illumination system is changed or removable;

B. The optical components other than the condenser lens system in the illumination system are changed;

C. The focal length of the condenser system in the illumination system is variable; and D. The zoom type illumination system is employed.

However, according to these methods, whenever the objective lenses are changed, the condenser lens systems or illumination system must be changed or adjusted so as to satisfy the conditions (I) and (II) and the aperture stop and/or field stop must be adjusted.

For example, in case of the method (B) above which is widely used at present, a common condenser system is used at low and high magnification so that without a suitable adjustment of the aperture stop the resolution power is lowered due to an unsufficient aperture angle or flare is produced due to an excessive opening of the aperture stop. Unless the field stop is adjusted whenever the objective is changed, flare is produced or the field of illumination becomes insufficient because the actual field of view of the microscope is varied depending upon a magnification. The control of the aperture stop and/or the field stop described must be made in case of photomicrography.

From the foregoing description it is seen that the adjustments of the aperture stop and the field stop are very complicated especially when photomicrography is successively made from a low magnification to a high magnification and when the specimen must be observed with a higher degree of accuracy. Especially the control of the aperture stop is extremely difficult because the adverse effect would be brought about unless the aperture opening is adjusted precisely in reference to the graduated scale or while observing the plane of the pupil of the objective lens. Furthermore, these adjustments are neglected very often in practice and an operator will usually notice his negligence only when unsatisfactory photos are developed and printed.

SUMMARY OF THE INVENTION

It is therefore the primary object of the present invention to provide an improved illumination system for microscope which completely satisfied the conditions described above of the Köhler's method so as to eliminate the defects or problems described above. The operation of the microscope may be much simplified.

To attain this and other objects of the present invention, in brief the present invention provides an improved illumination system for microscopes in which a plurality of pairs, each pair consisting at least an objective lens and a condenser lens, is provided, and one of the pairs corresponding to a certain magnification is aligned on the observation optical axis of the microscope, wherein the ratio of the focal lengths of the condenser lens and the objective lens constituting a pair being determined at a constant regardless of the magnification.

The present invention will become more apparent from the following description of the preferred embodiments thereof taken in conjunction with the accompanying drawing.

DESCRIPTION OF THE PREFERRED EMBODIMENTS

Figure 1:
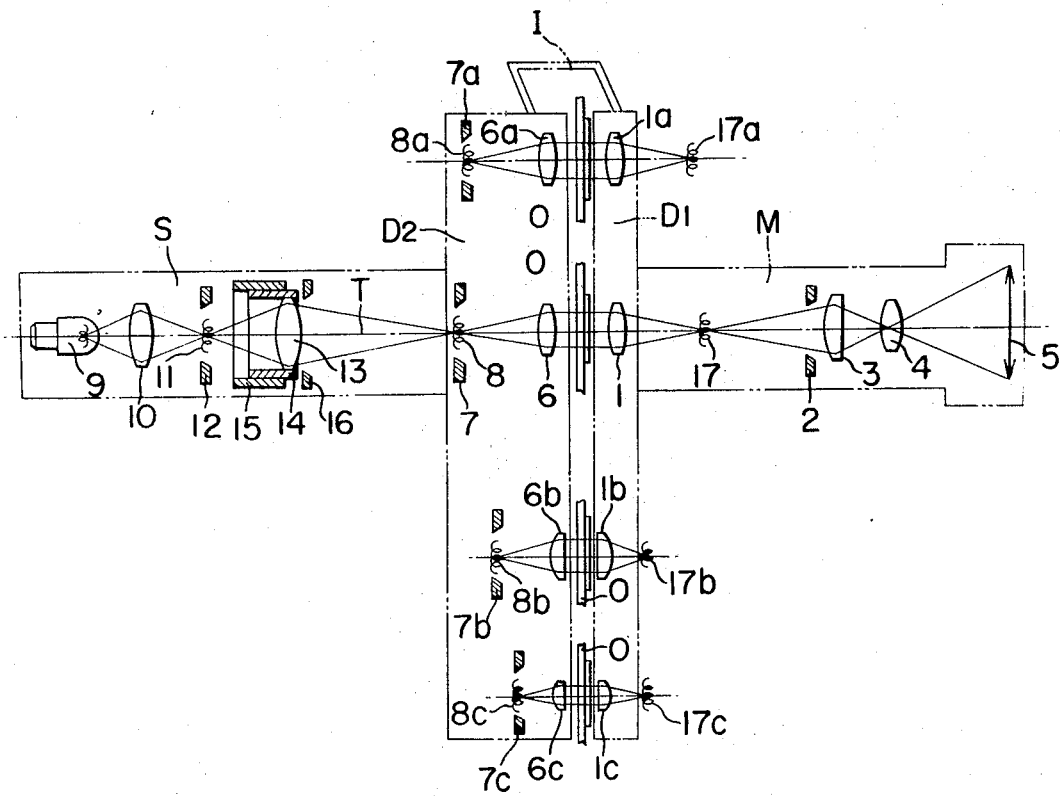
FIGS. 1 and 2 are diagrammatic views illustrating a first and second embodiments of an illumination system in accordance with the present invention.

In FIG. 1, M is the main body of a microscope, S is the main body of an illumination device, O is a specimen or an object to be observed or photographed, and T is an optical axis common to said main bodies of the microscope M and illumination device S. Lenses 1, 1a, 1b and 1c are objectives having different magnifications, i.e., focal length or aperture opening angle, and provided within a first supporting member D1 which is displaceable to the main body of the microscope M. The first supporting member D, is operated from outside such that objective lens group 1, 1a, 1b and 1oc can be aligned on the optical axis T successively. Within the main body of the microscope M, an observing field stop 2 is provided on the optical system T at a position conjugate with the specimen O relative to the objective lens group, the stop 2 having the common aperture to said objective lens group. An eye-piece 3, a projection lens or eye 4 and a film surface of the retime of the eye 5 are also provided in the main body M.

Lenses 6, 6a, 6b and 6c are a condenser lens group, each corresponding to said objective lenses 1, 1a, 1b and 1c, respectively and having different focal lengths. The condenser lens group is provided within a second supporting member D2 movable with respect to said main body of the illumination device S. Aperture stop group consists of aperture stops 7, 7a 7b and 7c, each of which corresponds to an of objective lens - condenser lens pair. Each aperture stop has a specific aperture opening corresponding to a magnification of the objective lens, and is provided at the front focal point plane 8, 8a, 8b, or 8c within the supporting member D2.

As shown in FIG. 1, said first and second supporting members D1 and D2 are interlocked by a conventional means I in such a manner that each pair consisting of the corresponding objective lens and condenser lens including the aperture stop is successively aligned on the optical axis T. For example, each of said first and second supporting members are formed in a rotating body such as rotary drum coupled by a transmitting member such as gear.

In the main body of the illuminating device S, a light source 9, a collector lens 10, a primary light source image 11, a frame or a stop 12 for determining the dimension of the image 11, a relay lens 13, a retainer 14 for retaining the relay lens 13 and a field stop 16 are provided. The primary light source image 11 is the image of the light source 9 formed by the collector lens 10 and constitutes in practice a light source when using the microscope. The stop 12 is to determine the size of the image 11 and its opening size is determined depending on the kind of specimen, purpose of phototaking, or illuminating percentage of the aperture number of the objective lens and this size is preferably preadjusted. It is convenient if the aperture size of the stop 12 is made variable. The relay lens 13 is to focus the primary light source image 11 at the front focal point surface 8, 8a, 8b, or 8c of the condenser lens group 6, 6a, 6b, or 6c. The retaining member 14 is arranged shiftably along the optical axis T on the guide surface 15 of the main body S. The field stop 16 of the illuminating device has a common aperture size relative to the whole condenser lenses 6, 6a, 6b, and 6c, and is provided at a position conjugate with said specimen surface O relative to said condenser lens group. Consequently, the field stop 16, the specimen surface O and observing field stop 2 are arranged in conjugate relation with each other.

In the foregoing constitution, each pair consisting of each objective 1, 1a, 1b or 1c and the corresponding condenser lens 6, 6a, 6b or 6c is defined to constitute the following condition.

$$fc/fo = fca/foa = fcb/fob = fcc/foc = \alpha$$

where $fo$ is the focal length of 4 x objective 1;

$fc$ is the focal length of the condenser lens 6 relative to 4 x objective;

$foa$ is the focal length of 10 x objective 1a;

$fca$ is the focal length of the condenser lens 6a relative to 10 x objective;

$fob$ is the focal length of 40 x objective 1b;

$fcb$ is the focal length of the condenser lens 6b relative to 40 x objective;

$foc$ is the focal length of 100 x objective 1c;

$fcc$ is the focal length of the condenser lens 6c relative to 100 x objective.

It is convenient for design if $\alpha$ is determined within the range of $1 < \alpha < 10$.

When the pairs of the objectives and condensers 1 and 6; 1a and 6a; 1b and 6b and 1c and 6c are successively changed to locate upon the optical axis T, the front focal planes 8–8c are moved along the optical axis T. Therefore the relation of the pairs 1 and 6; 1a and 6a; 1b and 6b; and 1c and 6c with the relay lens 13 is determined as follows. That is, in order that the primary light source image 11 is focused upon the front focal planes 8 – 8a of the condenser lenses 6 – 6c even when the objective-and-condenser-lens pairs are changed from one to another, the first and second supporting members D1 and D2 are operatively coupled to the supporting member 14 by a suitable conventional cam mechanism so that the relay lens 13 may be displaced along the optical axis T by a distance in accordance with the optical properties of the condenser lenses 6 – 6c.

Figure 2:
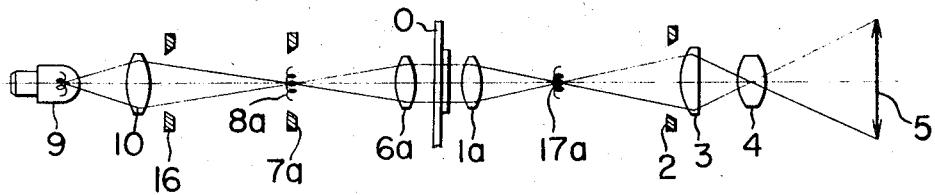

Non-uniform illumination tends to occur when a low and medium magnifying power objectives are used. Therefore as viewed from FIG. 2 even when the image of the light source 9 by the collector lens 10 is focused directly upon the front focal plane 8a of the condenser lens 6a which is used in combination with the low or medium magnifying power objective lens for example of 10X, there occurs no problem in uniformity of illumination at high magnifying power.

The primary light source image 11 of the light source 9 by the collector lens 10 is focused upon the front focal plane 8 of the condenser lens 6 by the relay lens 13 and is further focused at the pupil 17 of the objective 1 through the condenser and objective lenses 6 and 1. The pair of the objective 1 and the condenser 6 is chanGed to the pair of the objective 1a and the condenser 6a, the relay lens 13 is displaced along the optical axis T by a distance corresponding to the optical properties of the condenser lens 6a so that the primary light source image 11 may be focused upon the front focal plane 8a. Consequently the primary light source image 11 is focused upon a plane of the pupil 17a of the objective lens 1a.

When any of the pairs of the objective and condenser lenses 1 and 6 through 1c and 6c are used, the primary light source image 11 is focused upon the planes of pupils 17 through 17c of the objective lenses 1 through 1c, respectively. In this case, the aperture angles of the objectives 1 through 1c is correctly controlled by the stops 7 through 7c, respectively. Since the stop 16, the specimen plane O and the stop 2 are in conjugated relation with each other, the light rays passing through the stop 16 for controlling the field of view is always focused as an image having the same size upon the plane of the stop for the field of view Z even when the objective and condenser lens pairs 1 and 6 through 1c and 6c are changed from one to another. In other words, it is not necessary to adjust the opening of the stop 16 for controlling the field of view even when the objective lenses are changed. However, it should be noted that the size of the image of the stop 7 may be constant as far as the field of view of the eyepiece remains unchanged.

The image of the light source is focused upon the planes of the pupil or the back focal planes of the objective lenses 17 through 17c and changes its dimensions depending upon the displacement of the relay lens 13. HOwever since the ratios of the focal lengths of the objectives with those of the paired condenser lenses are the same, there is only a very little difference in the dimensions of the light source images at low and high magnifications. Therefore, when the light source image is maintained to have for example the largest dimensions, each of the objective lenses 1 through 1c may have a sufficient illumination opening angle. Strictly speaking, the better contrast with the better resolution power is obtained when the illumination aperture angle is about 60 – 70 percent of the aperture angle of the objective lens. In this case, the openings of the stops 7 through 7c may be adjusted in response to the aperture angles of the objective lenses. Therefore when the light source 9 is directly focused upon the front focal planes 8 through 8c of the condenser lenses by the collector lens 10 as viewed from FIG. 2, the optical system may be simplified. In both of the embodiments of the present invention, when the opening of the diaphragms are previously adjusted, the illumination with a constant aperture ratio may become possible even when the objective-and-condenser-lens pairs are changed.

From the foregoing description it is seen that opposed to the conventional Köhler's method the adjustments of the field stop and the aperture stop for controlling the field of view is not required even when the objective lens is changed. In addition, the sufficient illumination aperture angle as well as the sufficient field of view may be obtained. Since the condenser lens systems suitable for the individual objective lens groups are provided, the very uniformly illumination field of view may be obtained. Therefore, by a simple operation a magnified image having a contrast and resolution power better than those obtained by the conventional Köhler's method may be viewed or recorded.

What is claimed is:

1. In an illuminating optical system for illuminating an object in a microscope utilizing Kohler's method comprising,
    a light source;
    a collector lens for forming the image of the light source;
    a plurality of interchangeable condenser lenses;
    each condenser lens being alternatively moved from an inoperative position in which the condenser lens is out of the optical axis into an operative position position in which a focal point of said moved condenser lens is located about at the point in which the image of the light source is formed,
    said object being illuminated by the light passing through one of a plurality of condenser lenses, which is in the operative position thereof;
    a plurality of interchangeable objective lenses;
    each objective lens being arranged in paired relation to each condenser lens and alternatively moved together with the paired condenser lens into an operative position for forming the image of the object,
    a plurality of interchangeable aperture stops;
    each aperture stop being arranged in paired relation to each condenser lens between the condenser lens and the collector lens and having an aperture opening corresponding to the magnification of the corresponding objective lens and being movable together with the corresponding objective and condenser lens pair, each aperture stop being located at the focal point of its corresponding condenser lens,
    a field stop being disposed at a conjugate point relative to the object between said collector lens and the aperture stop which is in the operative position thereof;
    an eyepiece for enlarging the image of the object;

the improvement residing in that the ratio of the focal length of each objective lens to that of the paired condenser lens is equal.

2. Apparatus according to claim 1 further comprising relay lens means interposed between said field stop and said collector lens, and a stop interposed between said relay lens and said collector lens for determining the image of the light source.

3. Apparatus according to claim 1 further comprising an observing field stop disposed at a position conjugate with the object relative to the objective lens group.

* * * * *